J. M. LARSON.
TEMPERATURE REGULATING APPARATUS.
APPLICATION FILED SEPT. 21, 1909.
1,058,874.
Patented Apr. 15, 1913.
2 SHEETS—SHEET 1.
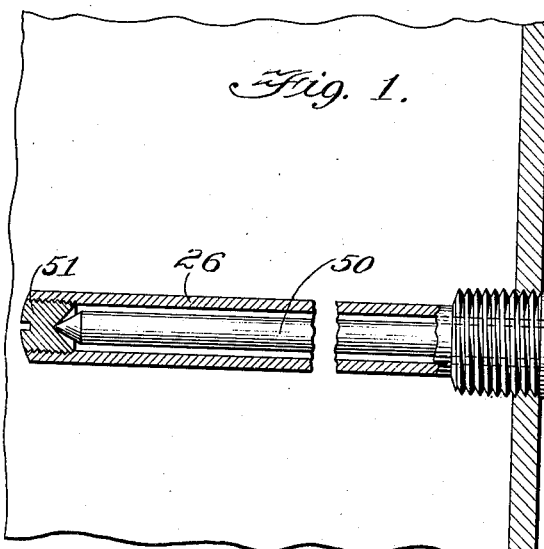
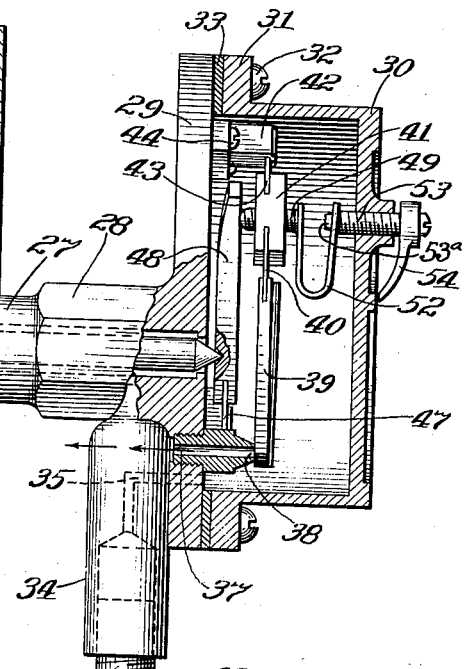
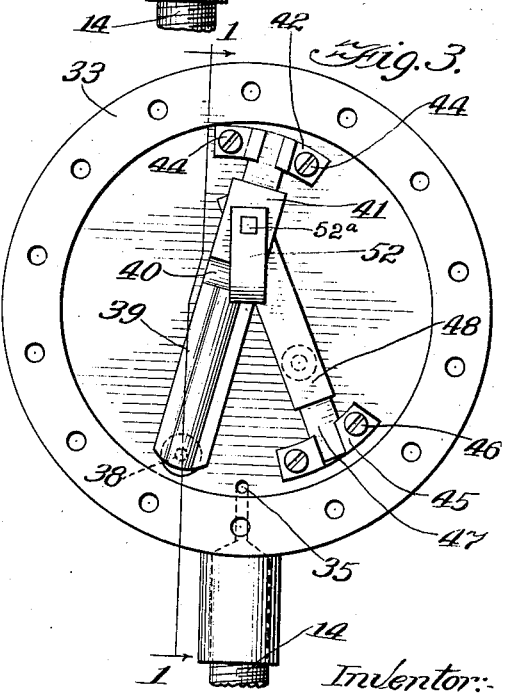
Witnesses:
Urw. H. Yagle
Chas. L. Hopkins
Inventor:
John M. Larson,
by Jones, Addington & Ames,
Attys.

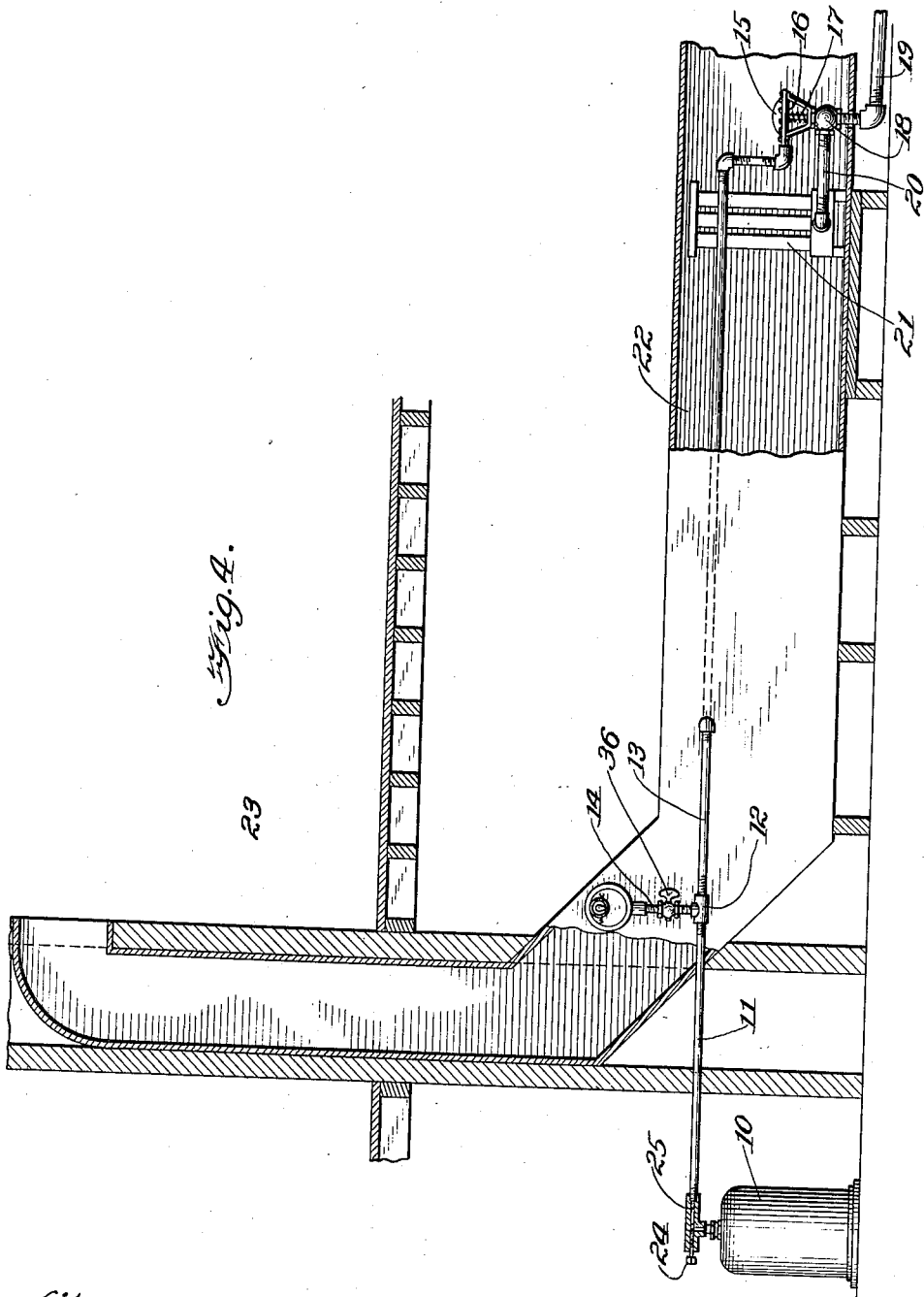

UNITED STATES PATENT OFFICE.

JOHN M. LARSON, OF CHICAGO, ILLINOIS, ASSIGNOR TO NATIONAL REGULATOR COMPANY, OF CHICAGO, ILLINOIS, A CORPORATION OF ILLINOIS.

TEMPERATURE-REGULATING APPARATUS.

1,058,874.     Specification of Letters Patent.     Patented Apr. 15, 1913.

Application filed September 21, 1909. Serial No. 518,760.

*To all whom it may concern:*

Be it known that I, JOHN M. LARSON, a citizen of the United States, residing at Chicago, in the county of Cook and State of Illinois, have invented new and useful Improvements in Temperature-Regulating Apparatus, of which the following is a full, clear, concise, and exact description, reference being had to the accompanying drawing, forming a part of this specification.

This invention relates to improvements in temperature regulating apparatus, and particularly to that type of temperature regulating apparatus in which a thermostatically actuated device governs the flow of a fluid, such as compressed air, to and from a motor which in turn controls the action of heating apparatus.

One of the objects of the invention is to provide a device of this type in which the action of the motor is made positive, that is, one in which the motor, after starting to move, either to admit or shut off the heating medium, will immediately complete its movement before moving in the opposite direction, as distinguished from those devices in which the action of the motor is graduated, or in other words, those devices in which the motor stands at a definite intermediate position so long as the temperature conditions of the medium in which the thermostat is placed remain constant.

Another object is to provide a device in which the thermostatically actuated means for controlling the flow of the operating fluid is so constructed that the thermostatic element may be disposed within a duct, tank or the like, while the remainder of the device is located outside the tank or duct so as to be readily accessible.

Another object is to provide a thermostat in which the adjustment is made at the front of the same, in order that the thermostatic element may be located, when desired, behind or within the wall of a tank, duct, partition or the like and adjustment may be effected without the necessity of going behind said wall or withdrawing the device.

In the accompanying drawings—Figure 1 is a view, partly in section, of the thermostatically actuated device which controls the flow of operating fluid and therefore controls the action of the motor, the section being taken on the line 1—1 of Figs. 2 and 3, looking in the direction of the arrows. In this view the thermostatically sensitive portion of the controlling apparatus is shown as inserted into the air duct of a heating system through the wall thereof. Fig. 2 is a front elevational view of the device. Fig. 3 is a front elevational view of the same with the cover or shell which normally closes the front of the device and houses the principal part of the mechanism thereof removed, and Fig. 4 shows my invention as applied to a heating and ventilating system for an apartment.

In the particular system illustrated in the drawings, 10 is a tank containing compressed air or other suitable fluid under pressure. The usual means, not shown, are employed for maintaining the pressure in the tank, this portion of the apparatus constituting no part of the present invention. Leading from the tank 10 is a pipe 11 which divides at 12 into two pipes designated 13 and 14 respectively. The pipe 13 leads to a diaphragm motor 15 of the usual type, while pipe 14 leads to the thermostatic controlling device illustrated in detail in Figs. 1, 2 and 3.

The pressure motor 15 has the usual diaphragm 16 and spring 17 which tends to raise the diaphragm. The passage of air under pressure from the tank 10 into the space above the diaphragm causes the latter to move downward and thus close the steam valve 18, the inlet side of which is connected by means of a pipe 19, with a boiler or other source of supply of heating fluid. The outlet side of the steam valve is connected by means of a pipe 20 with the steam radiator 21. The flexing of the diaphragm 16 downward when compressed air is admitted to the motor 15, as is well known, causes the valve to close and thus shut off the supply of steam which would otherwise pass to the radiator 21.

The radiator is located in a duct 22 which leads to and opens at its upper end into the apartment or room 23 that is to be warmed. In such a system of heating as is illustrated the air is not passed through the heating drum of a furnace but is passed between the heating pipes of a steam radiator before being delivered to the room which is to be heated and ventilated. In such a case the thermostatic device which controls the flow of compressed air to the motor of the steam valve is usually located in the room the temperature of which is to be controlled. In some cases, however, it is desired to regulate and maintain constant the temperature of the air which passes into the room, and the device herein illustrated is particularly adapted for the latter system.

Between the tank 10 and the point at which the pipe 11 divides and passes to the motor and controlling device respectively, means are provided for restricting the rate of flow of air through the pipe 11, a suitable means for this purpose comprising a screw 24 which extends into a passage 25 through which the air must flow, the extent to which the screw is turned into this passage determining the capacity of the passage and therefore the amount of air which can flow through the pipe 11 with a given pressure existing in the tank 10.

The thermostatic device to which leads the pipe 14 comprises an elongated tubular metallic member 26, having near one end a portion 27 of greater diameter than the main body portion and exteriorly threaded in order that after the smaller part is thrust through an opening in the side of a duct or tank the threads on the part 27 enable the device to be screwed firmly into the opening. The portion 27 is further expanded at 28 and formed with a hexagonal part for the reception of a wrench. At the front of the portion 27 the device is expanded to form a head 29 of circular contour, on the face of which is mounted certain valve mechanism, this mechanism being concealed and protected by a cover or cap 30 having a flange 31 through which extend screws 32 into the head 29. In order that the joint between the head 29 and the cover 30 may be airtight a gasket 33, of leather or other slightly yielding material, is arranged between the head and the flange 31 of the cover. The casting which constitutes the larger part of the device is provided with a tubular extension 34 which is screw threaded interiorly for the reception of the pipe 14. This portion 34 extends downward at right angles with the long tubular portion 26 of the device and is connected, by means of a passage 35, with the chamber within the cap or cover 30. This chamber is thus constantly in communication with the supply tank 10 except when purposely disconnected therefrom by the closing of a suitable hand valve 36 which is arranged in the pipe 14. This valve is ordinarily left open and may be dispensed with entirely if desired.

A second vent port 37 opens at one end at a valve seat 38 within the chamber of the device and at its opposite end opens to the atmosphere. The vent port 37 serves as a vent port and it is by the opening and closing of this port, and consequently the venting of the motor 15 or the accumulation of pressure therein that the motor is controlled. Thermostatically actuated means are provided for opening and closing this port, said means comprising a valve piece 39 supported by a resilient hinge formed by a flat strip 40 of spring metal secured at its lower end to the upper end of the valve piece 39 and at its upper end to a block 41. The block 41 is hinged to a stationary support 42 by means of a flat spring strip 43. The support 42 consists of a post secured to the face of the head 29 by means of screws 44.

A post 45 is secured to the face of the head 29 by means of screws 46 and has secured thereto one end of a flat spring strip 47, the free end of which has secured thereto and carries a bar 48. This bar bears at its upper end against a screw 49 which extends through the block 41. A bar 50 extends longitudinally through the tubular portion 26 of the device and has its ends pointed, one of these ends thrusting against the bar 48 while the opposite end thrusts against a plug 51 which is screwed into the end of the tubular part 26. The part 26 and the rod 50 are made of dissimilar metals, these metals having different coefficients of expansion under temperature changes, and the inner member, which is the bar 50, being furthermore protected from sudden changes of temperature by being inclosed within the member 26. I have found that if the member 26 be formed of brass and be given a length of approximately ten inches from the threaded portion 26 to its opposite end, the rod 50 being of iron, satisfactory results are obtained, the amount of expansion and contraction, and consequently the amount of movement which the front end of the rod 50 has, being sufficient for the purpose intended. When the tubular portion 26 shortens, due to a fall in temperature, the rod 50, bearing against the bar 48 near its hinged end, causes the free end of the bar to move, the bar becoming a lever of the third class and multiplying the movement imparted thereto by the rod. This movement is transmitted through the screw 49 to the block 41 and thence to the spring strip 40. The latter is thus given a tendency to move the valve piece 39 away from its seat and open the vent port 37. This tendency is, for a time, resisted by the pressure within the chamber of the device, energy being meanwhile stored and gradually increased in the spring strip 40 until at length the tendency of the latter to move the valve piece away from its seat becomes great enough to overcome the tendency of the same to stick to its seat due to the pressure within the chamber. Thereupon the valve piece suddenly breaks away from its seat and moves quickly to wide open position. When the valve thus opens the pressure within the chamber suddenly falls, as the air confined therein under pressure is permitted to escape quickly through the port 37, which is of sufficient diameter to allow the air to pass out almost immediately.

Upon the sudden opening of the port 37 the air confined under pressure in the motor 15 is quickly exhausted through the pipe 13, the chamber of the thermostatic device and the port 37. This permits the spring 17 of the motor to quickly open the steam valve and allow steam to pass through the pipes 19 and 20 to the radiator 21. The air which passes through the duct 22 is now warmed by its passage over and between the pipes of the radiator. After this has continued for a time the air which is being delivered to the room may be too warm and it is therefore required that the temperature of the radiator be lowered. With certain types of steam heating apparatus it is not practical to reduce the pressure in the radiator by partly closing the steam valve as this would cause water to accumulate in the radiator. With such systems it is necessary that the steam be turned fully on or fully off. The device of my invention is adapted for use in a system which employs this type of steam heating apparatus, as it turns the steam on completely and quickly and thereafter holds the steam valve open for a time, then closes the valve quickly and completely.

As the temperature of the air which passes through the duct and issues into the apartment rises and approaches the predetermined point at which it is desired that the radiator valve be closed, the tubular portion 26 of the thermostatic device lengthens and thus causes the pressure exerted by the rod 50 upon the bar 48 to decrease. The valve piece 39 is thus permitted to gradually approach its seat 38 under the influence of the plate spring 43 until at length the valve piece reaches a position at which it is so close to the port that less air can pass out through the same than the restriction in the pipe 11 permits to flow into the chamber of the device through said pipe. The rush of air out through the port thereupon sucks the valve piece down against its seat 38 and quickly closes the port against further escape of air. This is permitted by the flexibility of plate spring 40. When the valve 39 thus seats the pressure within the chamber of the thermostatic device and the chamber of the motor 15 rises rapidly as no air is now permitted to escape to the atmosphere. The motor diaphragm is rapidly inflated and the valve 18 shuts off the flow of steam to the radiator. It will be understood that the action of the device in closing the steam valve, while rapid, is not accomplished so quickly as is the opening of the same. The necessity of opening the valve quickly is much greater than that of closing it quickly.

To afford means for regulating the temperature point at which the device will operate to open or close the steam valve suitable means for adjusting the length of that part of the screw 49 which is located between the block 41 and the bar 48 are provided, said adjusting means being accessible from the front so that when the device is used in an air duct, as in the system illustrated, it is not necessary to go into the duct in order to adjust the screw plug 51, as would otherwise be the case, or to take off the cover 30, which would permit the escape of air and thus prevent the device from operation while the adjustment was being made. This adjustment device comprises a U-shaped strip 52 of metal which is somewhat resilient and has one of its ends soldered or otherwise secured to the screw 49 and its opposite end formed with a square aperture 52ª to receive the correspondingly squared inner end 53ª of a screw 53. The screws 49 and 53 have threads of the same pitch. The screw 53 extends through a threaded opening in the cover 30 and carries upon its outer end an indicating pointer 54 which moves over a curved scale 55 provided on the front of the cover. If desired the letters W and C may be marked at the ends of the scale, these letters meaning "warmer" and "cooler" respectively. By turning the pointer 54 one way or the other and thus turning the screw 53 and the screw 49 in or out the distance which the front end of the rod 50 must move forward in order to open the valve is increased or diminished and consequently the amount of contraction of the tubular member 26 which would be required to effect the desired result is altered, whereby the amount of temperature change upon which the device will operate is determined. It will be seen that the combined length of the screws 49 and 53 will always remain the same, as the turning of the screw 53 by means of the pointer 54 also turns the screw 49 in the same direction and to the same extent. The tension of the U-shaped strip 52, and therefore the pressure exerted upon the block 41 by this strip, is not altered by the changing of the adjustment, and need not, therefore, be taken into account.

The cover 30 may be removed when necessary without disturbing any other part, the squared end 53ª of the adjusting screw 53 withdrawing from the opening 52ª in the resilient strip 52. When the cover is replaced the screw 53 may require turning slightly in one direction or the other to cause the squared end of the screw to aline with the squared aperture in the spring. When the screw is turned to the proper position the strip 52 snaps back upon the end of the screw and couples the parts together. It will be seen that as the block 41 swings the screw 49 is permitted to assume whatever angular relation to the screw 53 is required.

This form of thermostatic controlling device is well adapted for use in water tanks or the like where the temperature is to be maintained constant and when the heating apparatus is such as to require a positive, as distinguished from a graduated, control.

Having thus described my invention, what I claim as new and desire to secure by Letters Patent, is:

1. The combination with a motor and a source of supply of fluid under pressure, of a controlling device having a chamber in constant communication with said motor and having a vent port with means for alternately opening and closing said port comprising a valve within said chamber arranged to be held to said port by the pressure within said chamber, a tubular thermostatic element, a rod extending through said element and into said chamber, said rod being thrust into said chamber by the contraction of said element, a lever in said chamber, a member located in said chamber and hinged at one end, a plate spring secured to the other end of said member and carrying said valve, said lever thrusting against said member and tending to open said valve, and means for adjusting the distance between said lever and said member.

2. The combination with a motor and a source of supply of fluid under pressure, of a controlling device having a chamber in constant communication with said motor and having a vent port, with means for alternately opening and closing said port comprising a valve within said chamber arranged to be held to said port by the pressure within said chamber, a tubular thermostatic element, a rod extending through said element into said chamber and arranged to be thrust into said chamber by the contraction of said element, and yielding connection between said rod and said valve in which energy is stored during the contraction of said element whereby, when the pressure within said chamber is overcome, said valve suddenly uncovers said vent port.

3. The combination with a motor and a source of supply of fluid under pressure, of a controlling device having a chamber in constant communication with said motor and having a vent port, with means for alternately opening and closing said port comprising a valve within said chamber arranged to cover said port and adapted to be held to said port by the pressure within said chamber, a tubular thermostatic element, a rod extending through said element into said chamber and arranged to be thrust into said chamber by the contracton of said thermostatic element, a lever in said chamber against which said rod thrusts, and energy-storing means intermediate said lever and said valve in which energy is accumulated during the contraction of said element whereby, when the pressure within said chamber is overcome, the valve will suddenly uncover said vent port.

4. The combination with a motor and a source of supply of fluid under pressure, of a thermostatic controlling device having a chamber in constant communication with said motor and having a vent port, a valve within said chamber arranged to cover said port and to be held thereto by the pressure within said chamber, a tubular thermostatic element, a rod inclosed by said element and arranged to be thrust into said chamber by the contraction of said element, a lever in said chamber against which said rod thrusts, energy storing means intermediate said lever and said valve in which energy is accumulated during the contraction of said element whereby, when the pressure within said chamber is overcome, the valve will suddenly uncover said vent port, and means extending to the exterior of said chamber for adjusting the temperature at which said valve will uncover said port.

5. The combination with a motor and a source of supply of fluid under pressure, of a thermostatic controlling device having a chamber constantly communicating with said motor and having a vent port, a valve arranged to cover said port and to be held thereto by pressure within said chamber, a flat spring carrying said valve, a hollow thermostatic member, a rod within said member arranged to project into said chamber and to be thrust into said chamber by the contraction of the thermostatic member, a lever against which said rod thrusts, said lever being arranged to flex said spring and thereby tend to open said valve, and means adjustable from the exterior of said chamber for varying the pressure of said lever upon said spring.

6. The combination with a motor and a source of supply of fluid under pressure, of a thermostatic controlling device having a chamber in constant communication with said motor and having a vent port, a valve within said chamber arranged to cover said port and to be held thereto by the pressure within said chamber, a tubular thermostatic element extending from said chamber, a rod inclosed by said thermostatic element and extending into said chamber, energy-storing means in which energy is accumulated during the contraction of said element, a screw extending to the exterior of said chamber, a pointer on said screw, and a lever within said chamber intermediate said energy-storing means and said rod, said screw being so arranged that the turning of said screw alters the pressure of said lever upon said energy-storing means and thereby adjusts the temperature point at which said valve will be caused to move away from said port.

7. The combination with a motor and a source of supply of fluid under pressure, of a thermostatic controlling device having a chamber in constant communication with said motor and having a vent port, a valve within said chamber arranged to cover said port and to be held thereto by the pressure within said chamber, a tubular thermostat, a rod extending through said thermostat into said chamber, resilient means intermediate said valve and said rod in which energy is stored during the contraction of said thermostatic element, and means extending to the exterior of said chamber for adjusting the temperature point at which said valve will be caused to move away from said port.

8. The combination with a motor and a source of supply of fluid under pressure, of a thermostatic controlling device having a chamber in constant communication with said motor and having a vent port, a valve within said chamber arranged to cover said port and to be held thereto by the pressure within said chamber, a tubular thermostat, a rod extending through said thermostat into said chamber, resilient means intermediate said valve and said rod in which energy is stored during the contraction of said thermostatic element, and means extending to the exterior of said chamber for adjusting the extent to which said rod must move into said chamber to store sufficient energy in said energy-storing means to cause said valve to separate from said port.

9. A thermostatic device for controlling the flow of a fluid under pressure, said device having a closed chamber communicating with a source of supply of fluid under pressure and having a port, a valve in said chamber for closing said port, means influenced by thermostatic changes for operating said valve, an adjusting screw intermediate said thermostatically influenced means and said valve, a screw extending through the wall of said chamber, and flexible connection between said screws so arranged that rotation imparted to said last-named screw is transmitted to said first-named screw.

10. A thermostatic device for controlling the flow of a fluid under pressure, said device having a pressure chamber and a passage communicating with said chamber, a valve in said chamber for closing said passage, a thermostatic element for controlling said valve, an adjusting screw for regulating the action of said thermostatic element upon said valve, a screw extending through the wall of said chamber, and flexible connection between said screws arranged to permit angular movement of said first-named screw and to transmit rotary movement from said second-named screw to said first-named screw.

11. A thermostatic device for controlling the flow of a fluid under pressure, said device having a closed chamber, a thermostatic element, a valve within said chamber actuated by said thermostatic element, an adjusting screw for regulating the action of said thermostatic element upon said valve, a resilient strip secured to said screw, and a second screw extending through the wall of said chamber, said resilient strip having a non-circular aperture and the end of the screw entering said aperture and fitting therein.

12. A thermostatic device having a closed chamber, a valve therein, a thermostatic element arranged to control said valve, a screw for adjusting the action of said thermostatic element upon said valve, a second screw extending through the wall of said chamber and having a thread of the same pitch and direction as said first-named screw, and resilient connection within said chamber arranged to permit angular movement and prevent rotary movement of said first-named screw with relation to said second-named screw.

13. A thermostatic device having a closed chamber, a valve therein, a thermostatic element arranged to control said valve, a screw for adjusting the action of said thermostatic element upon said valve, a second screw extending through the wall of said chamber and having a thread of the same pitch and direction as said first-named screw, and resilient connection within said chamber arranged to permit to-and-fro movement and prevent rotary movement of said first-named screw with relation to said second-named screw.

In witness whereof, I have hereunto subscribed my name in the presence of two witnesses.

JOHN M. LARSON.

Witnesses:
CHARLES G. COPE,
CHARLES L. HOPKINS.